United States Patent
Mertens

(10) Patent No.: US 6,244,714 B1
(45) Date of Patent: Jun. 12, 2001

(54) ADJUSTING MECHANISM FOR AN EXTERNAL REAR VIEW MIRROR FOR MOTOR VEHICLES

(75) Inventor: Jens Mertens, Stuttgart (DE)

(73) Assignee: Reitter & Schefenacker GmbH & Co. KG (DE)

( * ) Notice: Subject to any disclaimer, the term of this patent is extended or adjusted under 35 U.S.C. 154(b) by 0 days.

(21) Appl. No.: 09/405,912

(22) Filed: Sep. 24, 1999

(30) Foreign Application Priority Data

Sep. 26, 1998 (DE) .............................................. 198 44 269

(51) Int. Cl.[7] .............................. G02B 5/08; G02B 7/182
(52) U.S. Cl. .......................... 359/512; 359/507; 359/872; 359/877; 248/479; 248/481
(58) Field of Search .................................... 359/507, 508, 359/512, 872, 877, 514; 248/479, 481

(56) References Cited

U.S. PATENT DOCUMENTS

| | | | |
|---|---|---|---|
| 2,797,287 | * 6/1957 | Prutzman | 359/512 |
| 4,787,726 | * 11/1988 | Hendricks | 359/877 |
| 4,930,370 | * 6/1990 | Yoshida . | |
| 4,973,820 | * 11/1990 | Mittelhauser . | |
| 4,991,950 | * 2/1991 | Lang et al. . | |
| 5,155,625 | * 10/1992 | Komatsu et al. | 359/507 |
| 5,170,288 | * 12/1992 | Imaizumi et al. | 359/507 |
| 5,579,178 | * 11/1996 | Mochizuki | 359/877 |
| 5,669,698 | * 9/1997 | Veldman et al. . | |
| 5,721,646 | * 2/1998 | Catlin et al. | 359/877 |
| 5,724,186 | * 3/1998 | Collier | 359/507 |
| 5,889,624 | * 3/1999 | Dickenson | 359/512 |
| 5,971,552 | * 10/1999 | O'Farrell et al. | 359/877 |

* cited by examiner

Primary Examiner—Ricky D. Shafer
(74) Attorney, Agent, or Firm—Robert W. Becker & Associates

(57) ABSTRACT

An adjusting mechanism for an external rear view mirror for motor vehicles is provided. The adjusting mechanism includes a mirror glass holder connected to a drive housing. A mirror glass is mounted on the holder, and at least one electrical drive is provided for adjusting the holder. At least one heating element is also provided for heating the mirror glass. A single plug component is provided for supplying power to both the drives and the heating element, with the plug component being adapted to be connected to a power supply cord.

14 Claims, 1 Drawing Sheet

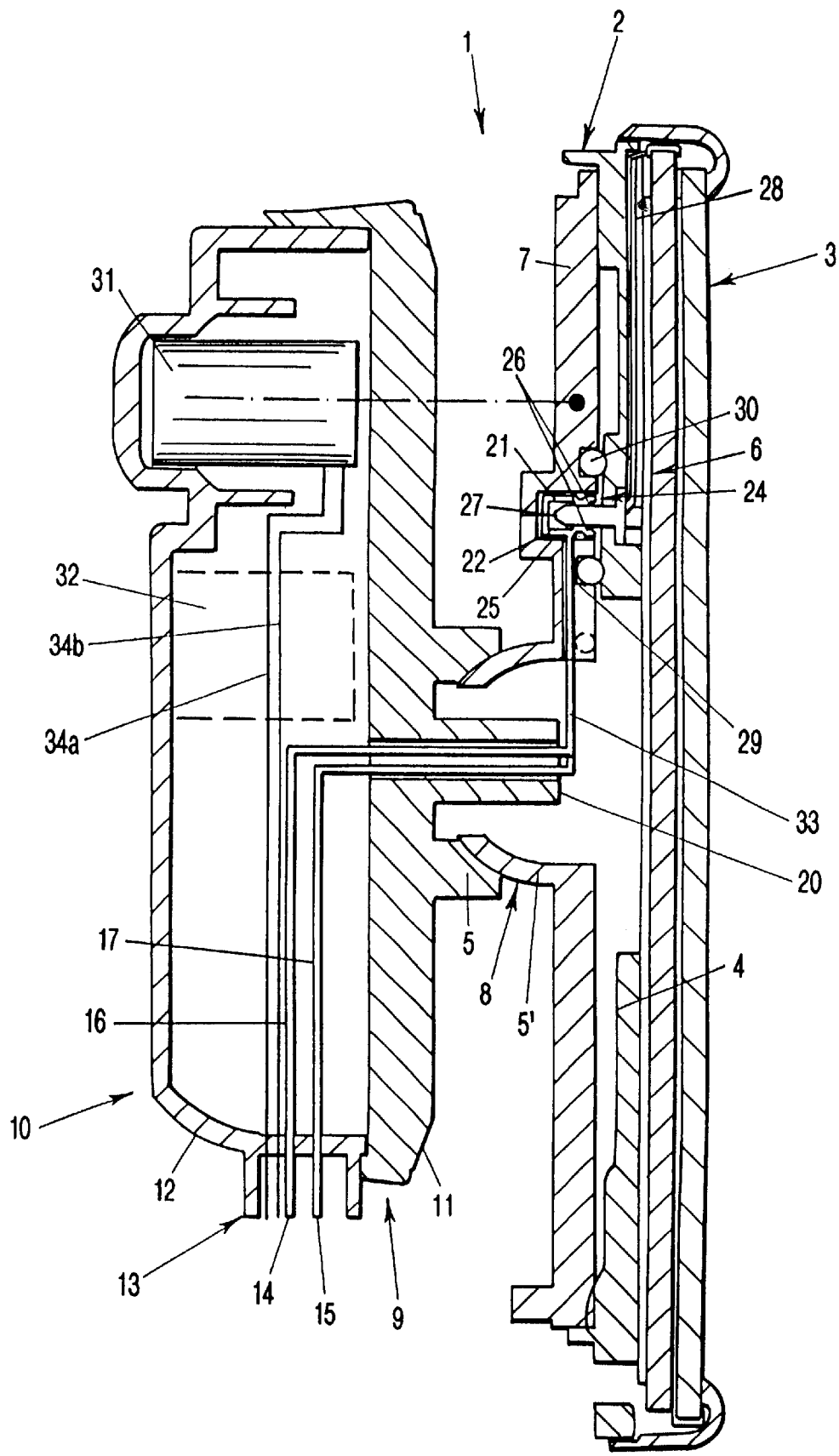

ADJUSTING MECHANISM FOR AN EXTERNAL REAR VIEW MIRROR FOR MOTOR VEHICLES

BACKGROUND OF THE INVENTION

The present invention relates to an adjusting mechanism for an external rear view mirror for motor vehicles, and includes a drive housing on which is mounted a mirror glass that is secured to a mirror glass holder that is adjustable by means of at least one electrical drive means. The mechanism also includes at least one heating element for heating the mirror glass.

External rear view mirrors are known where the mirror glass holder can be adjusted by an adjusting drive means. The mirror glass can also be heated by a heating element. However, the adjusting drive means and the heating element are electrically connected via leads to separate plug components. Each plug component must be connected to the battery of the vehicle via further lines or cables. Due to the presence of the various feed lines and plug components, assembly of such known external rear view mirrors is complicated and difficult. In addition, the cables and lines, which are loosely present in the mirror housing, are disruptive. In addition, such cables are exposed to environmental conditions, so that they can be easily damaged. It is also possible to connect the wrong feed lines to the plug components.

It is therefore an object of the present invention to provide an adjusting mechanism of the aforementioned general type whereby supply of power to the adjusting drive means and to the heating element is simplified in such a way that the mirror glass can be easily and economically assembled.

BRIEF DESCRIPTION OF THE DRAWING

This object, and other objects and advantages of the present invention, will appear more clearly from the following specification in conjunction with the accompanying schematic drawing, the single FIGURE of which is a cross-sectional view of one exemplary embodiment of the inventive adjusting mechanism for a rear view mirror, whereby a mirror glass can be set by the adjusting mechanism to the requirements of the driver.

SUMMARY OF THE INVENTION

The adjusting mechanism of the present invention is characterized primarily by a single plug component supplying power both to the electrical drive means and the heating element, with such plug component being adapted to be connected to a power supply cord. As a consequence of the inventive construction, only a single plug component is provided for the adjusting drive means and the heating element, with a power supply cord being connected to such plug component. As a result, a plurality of lines and plugs that have to be accommodated in the adjusting mechanism are eliminated, thus considerably simplifying assembly of the mirror. The mirror can therefore be economically produced. In addition, the danger is avoided that the leads in the mirror housing are exposed to environmental conditions and can therefore be damaged. Incorrect connections are reliably avoided. Furthermore, an additional integration in bus systems is also possible.

Further specific features of the present invention will be described in detail subsequently.

DESCRIPTION OF PREFERRED EMBODIMENTS

Referring now to the drawing in detail, the adjustment mechanism 1 is accommodated in a non-illustrated mirror head of an external rear view mirror, which by means of a non-illustrated mirror base is secured to a vehicle.

The adjustment mechanism 1 has a mirror glass holder 2, on which is disposed a mirror glass 3, which is preferably electrochromic (EC) glass.

The mirror glass holder 2 has a holder plate 4 upon which is secured the mirror glass 3, accompanied by the interposition of at least one heating element 6, preferably a heating foil.

The mirror glass holder 2 is secured to a preferably plate-like adjusting disk 7, which by means of a spherical joint 8 is pivotably connected with a drive housing 9. The housing 9 has a trough-shaped lower portion 10 and a cover 11. The outer surface of the housing cover 11 is provided with a joint socket 5 into which engages a joint head 5' that is provided on the adjusting disk 7. The joint socket 5 and the joint head 5' which form the spherical joint 8, are preferably integrally formed with the housing cover 11 and the adjusting disk 7 respectively.

Projecting beyond a side wall 12 of the lower portion 10 of the housing is a plug component 13, which is provided with connector ends 14 and 15 of leads 16 and 17. The lines 16, 17 extend through the lower portion 10 of the housing and project through a preferably cylindrical extension 20 that is centrally provided in the joint socket 5 and projects beyond such socket. The extension 20 is advantageously integrally formed with the cover 11 of the housing. The lines or leads 16, 17 extend through the extension 20 into the joint head 5', out of which they are laterally guided.

The adjusting disk 7 has a receiving means 25 that is embodied as a recessed portion and in which is accommodated an essentially U-shaped contact element 24 of a conductor plate of first conductor plate or 33 of adjusting disk 7 to which are connected the leads 16, 17. The parallel legs 21, 22 of the contact element 24 are each provided near their free ends with a constriction 26 that is formed by a V-shaped profiling of the legs 21, 22. When the mirror is assembled, a prong 27 projects into the contact element 24. The prong 27 is connected to a second conductor plate or printed circuit board 28 adjacent mirror glass holder 2 that is disposed between the heating element 6 and the holder plate 4. By means of the printed circuit board 28, the heating element 6 and the EC mirror glass are electrically connected. For this purpose, the printed circuit board 28 is provided with appropriate conduction paths.

A blinker light, which is advantageously electrically connected to the printed circuit board 28, can be provided behind the mirror glass 3. It is also possible to provide separate leads or conduction paths, which lead to the prong 27, or the heating element 6, the EC glass 3, and the blinker light. When the contact element 6 is inserted, the legs 21, 22 thereof are elastically spread apart due to the presence of the constrictions 26, so that the legs 21, 22 rest against the prong 27 with a high contact pressure.

It is to be understood that leads could also be provided in place of the printed circuit board 28.

Supply of electrical power is effected via the plug component 13, to which an appropriate power cord is connected. Such a power cord is guided through the non-illustrated base of the mirror into the motor vehicle, where it is connected to the vehicle battery. Since only a single plug component 13 is provided for supplying power to the various subassemblies of the external mirror, the mirror can be easily and economically assembled. A plurality of leads are eliminated, thus facilitating assembly of the mirror, especially the mirror glass 3.

By means of the plug component 13 the known drive motors 31, 32 for adjusting the mirror glass holder 2, and which are accommodated in the drive housing 9, are also supplied with power by connecting conductive lines 34a,b between single plug component 13 and drive motor 31,32.

Since only a single plug component 13 is provided, no errors can occur during assembly and when the power cord is plugged in, thus reliably avoiding false contacts.

The adjusting disk 7 is provided with an annular groove 29 that is preferably coaxial to the receiving means 25. Disposed in the annular grove 29 is an annular seal 30 for sealing the receiving means 25 and the prong 27. The annular seal 30 is sealingly disposed against a thicker portion of the mirror glass holder 2.

The specification incorporates by reference the disclosure of German priority document 198 44 269.6 of Sep. 26, 1998.

The present invention is, of course, in no way restricted to the specific disclosure of the specification and drawing, but also encompasses any modifications within the scope of the appended claims.

What is claimed is:

1. An adjusting mechanism for an external rear view mirror for motor vehicles, comprising:

a drive housing 9;

a mirror glass holder 2 pivotably connected to said drive housing;

a mirror glass 3 mounted on said mirror glass holder 2;

at least one electrical drive means 31,32 for adjusting said mirror glass holder 2;

at least one heating element for heating said mirror glass 3;

a single plug component 13 for supplying power to both said at least one drive means 31,32 and said at least one heating element 6, wherein said plug component 13 is adapted to be connected to a power supply cord 34, and is mounted on said drive housing;

prong contact means 24,27, said prong contact means further including lead means for connecting said single plug component 13 to said prong contact means, wherein said prong contact means includes at least one prong 27 connectable to said glass holder; and an adjusting disk 7, wherein said prong contact means includes at least one contact element 24 that is provided on said adjusting disk.

2. An adjusting mechanism according to claim 1, wherein said at least one heating element 6 is connected to said at least one prong 27.

3. An adjusting mechanism according to claim 1, wherein said at least one prong 27 is provided on at least one printed circuit board or second conductor plate 28.

4. An adjusting mechanism according to claim 3, wherein said at least one printed circuit board 28 is disposed between said at least one heating element and said mirror glass holder.

5. An adjusting mechanism according to claim 1, wherein said prong contact means 24 is disposed in a recessed portion 25 of said adjusting disk 7.

6. An adjusting mechanism according to claim 1, wherein said adjusting disk 7 is connected to said mirror glass holder 2.

7. An adjusting mechanism according to claim 1, wherein said prong contact means 24 is connected to said plug component 13 by means of leads or conduction paths 16, 17.

8. An adjusting mechanism according to claim 7, wherein said drive housing 9 is provided with an extension 20, and wherein said leads or other conduction paths 16,17 extend through said extension 20.

9. An adjusting mechanism according to claim 8, wherein said drive housing is provided with a cover 11, and wherein said extension 20 projects from said cover.

10. An adjusting mechanism according to claim 9, wherein further including a spherical joint 8 for pivotably connecting said mirror glass holder 2 with said drive housing 9, wherein said spherical joint 8 includes a joint socket 5 disposed on said cover 11, and wherein said extension 20 projects centrally through said joint socket 5.

11. An adjusting mechanism according to claim 1, wherein said prong contact means 24 and said at least one prong 27 are sealed.

12. An adjusting mechanism according to claim 11, wherein said prong contact means 24 and said at least one prong 27 are surrounded by a seal means 30.

13. An adjusting mechanism according to claim 12, wherein said seal means 30 is disposed in a recess 29 of said adjusting disk 7.

14. An adjusting mechanism for an external rear view mirror for motor vehicles, comprising:

a drive housing 9;

a mirror glass holder 2 connectable to said drive housing 9;

an adjustment plate 7 connectable to said mirror glass holder 2, said adjustment plate further comprising at least one contact element 24;

a mirror glass 3 mountable on said mirror glass holder 2;

at least one heating element 6 for heating said mirror glass 3;

at least one drive means 31, 32 for adjusting said mirror glass holder 2;

a conductor plate 28 electrically connectable to said heating element 6;

a prong 27 formed in said conductor plate 28;

a single plug component 13 for supplying power to both said at least one drive means 31, 32 and said at least one heating element 6, wherein said plug component 13 is adapted to be connected to adjustment plate 7; and prong contact means 24, 27, said prong contact means further including lead means for connecting said single plug component 13 to said prong contact means, wherein said prong contact means includes at least one prong 27 connectable to said glass holder.

* * * * *